United States Patent [19]
Sutphin, Jr.

[11] Patent Number: 4,790,012
[45] Date of Patent: Dec. 6, 1988

[54] ENCRYPTION-DECRYPTION SYSTEM

[75] Inventor: Eldon M. Sutphin, Jr., Merrimack, N.H.

[73] Assignee: General Electric Co., Burlington, Mass.

[21] Appl. No.: 811,272

[22] Filed: Dec. 20, 1985

[51] Int. Cl.[4] .............................................. H04L 9/00
[52] U.S. Cl. ....................................... 380/21; 380/34; 375/1
[58] Field of Search ......................... 375/1.0, 107, 2.2; 455/51; 343/112 TC; 342/31; 380/34, 21

[56] References Cited

U.S. PATENT DOCUMENTS

| | | | |
|---|---|---|---|
| 3,350,644 | 10/1967 | McNair | 375/107 |
| 3,680,121 | 7/1972 | Anderson et al. | 342/457 |
| 4,182,933 | 1/1980 | Rosenblum | 380/21 |
| 4,208,630 | 6/1980 | Martinez | 455/51 |
| 4,255,814 | 3/1981 | Osborn | 455/51 |
| 4,287,597 | 9/1981 | Paynter et al. | 455/51 |
| 4,301,539 | 11/1981 | Kage | 455/51 |
| 4,369,332 | 1/1983 | Campbell, Jr. | 178/22.18 |
| 4,475,215 | 10/1984 | Gutleber | 375/1 |
| 4,475,246 | 10/1984 | Batlivala et al. | 455/51 |
| 4,479,256 | 10/1984 | Sewerinson | 455/51 |
| 4,554,668 | 11/1985 | Deman et al. | 375/1 |
| 4,578,531 | 3/1986 | Everhart et al. | 380/21 |
| 4,617,674 | 10/1986 | Mangulis et al. | 375/107 |
| 4,630,283 | 12/1986 | Schiff | 375/1 |

Primary Examiner—Salvatore Cangialosi
Attorney, Agent, or Firm—I. David Blumenfeld; A. Amgott; P. Checkovich

[57] ABSTRACT

In a data encrypting/decrypting system both the encoding and decoding stations are receptive of a common source of time varying digital signals. The digital signals in the encoding station are applied to one or both of circuits for encrypting data supplied to the encoding station and spreading the spectrum of a carrier which is modulated by the encrypted data. The digital signals in the decoding station are applied to one or both of circuits for despreading the carrier transmitted by the encoding station and decrypting the received encrypted data. In the decoding station and optionally in the encoding station delays are interposed between the circuits therein and the reception point of the digital signals of values such that the digital signals arrive at the decoding station circuit(s) in synchronism with when data encoded in accordance with a particular digital signal arrives at the decoding station.

17 Claims, 1 Drawing Sheet

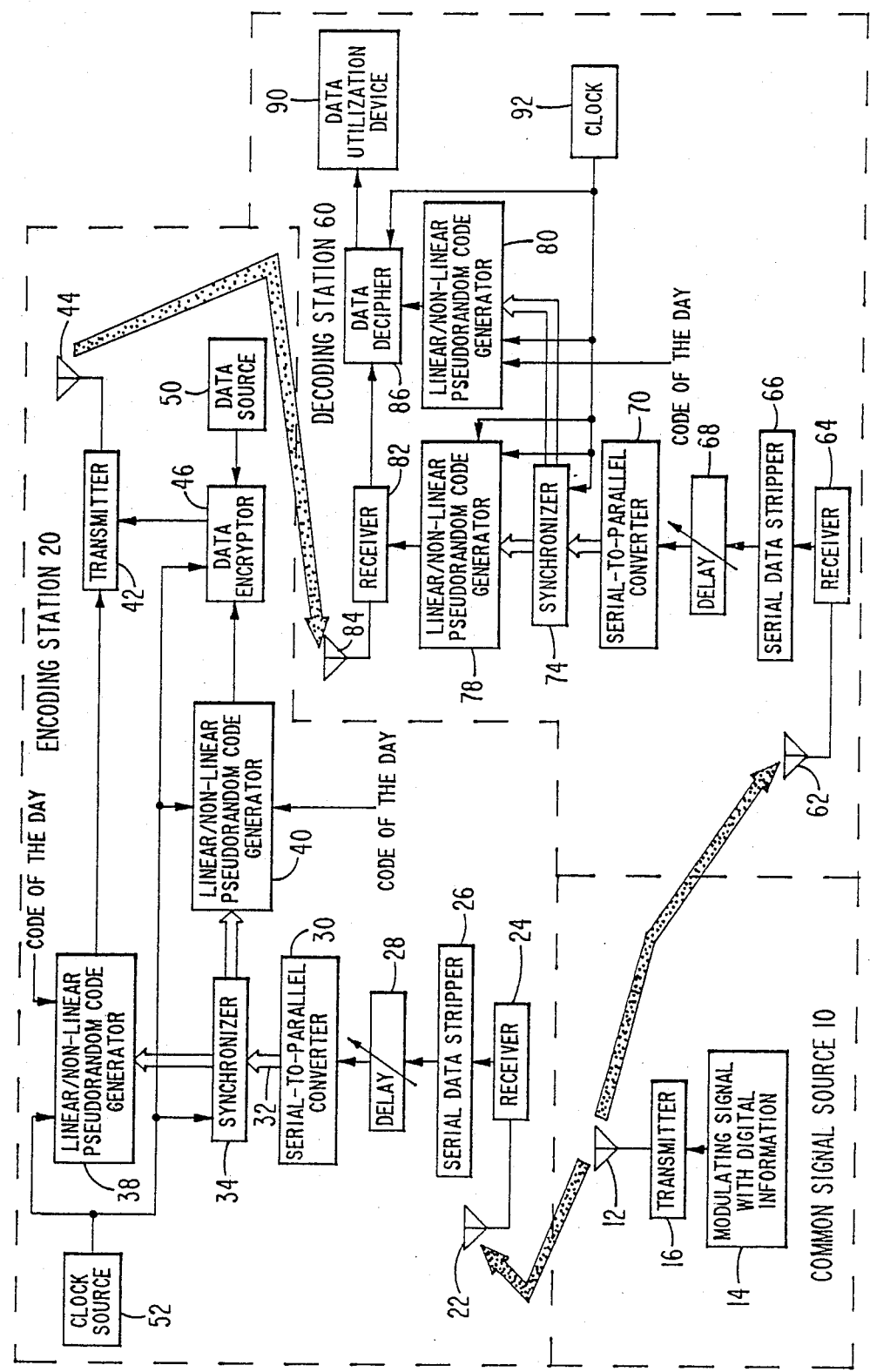

ENCRYPTION-DECRYPTION SYSTEM

BACKGROUND OF INVENTION

1. Field of Invention

This invention is concerned with encryption with an encryption/decryption system and more particularly with such a system incorporating time of day (TOD) signals to encrypt the encrypted signal.

2. Description of the Prior Art

It is common practice in data encryption and spread spectrum communications sytems to use digitally generated codes to provide data encryption and frequency spreading. The generated codes must be known at both the transmitting end (encryption station) and receiving end (decryption station) but not by the "enemy." Both linear and non-linear codes are used, with non-linear codes being used for higher security applications. Both codes are nearly impossible to break by an unsophisticated observer. However, linear codes are much easier to decipher by someone versed in the art. In many cases, codes are deciphered for code breaking purposes on a recorded basis, that is, the encrypted signal is recorded on some medium such as magnetic tape and then played back into a system containing deciphering algorithms.

Time of day encryption/decryption systems are also known which use a clock of some sort to modify the transmitted code and received code as a function of time of day (TOD). This is in addition to a modification by digital codes mentioned previously. It is the TOD encryption/decryption system upon which the invention improves.

SUMMARY OF THE INVENTION

An encryption/decryption system comprises in combination a signal source, an encoding station and a decoding station. The signal source comprises means transmitting a carrier modulated in accordance with digital signals which vary with time. The encoding station for transmitting, in encrypted form, data signals received thereat comprises in combination means receptive of the modulated carrier from the signal source for demodulating the carrier to thus produce a time varying digital signal, means for delaying the digital signal in accordance with the distance between the encoding station and signal source, one of means for encrypting a supplied data signal in accordance with the digital signal and means for transmitting the encrypted signal over a radio frequency spectrum spread in accordance with the value of said digital signal. The decoding station for receiving and decrypting data encrypted in the encoding station comprises in combination means receptive of the modulated carrier from the signal source for demodulating the carrier to thus produce the digital signal, means for delaying the digital signal in accordance with the distance to the decoding station from said signal source, the distance between the encoding station and decoding station and length of delay in the encoding station delay means, means receptive of the signal from the encoding station and responsive to the delayed digital signal from the signal source for despreading the transmitted radio frequency spread spectrum signal and decrypting the encrypting data signal to produce a signal having the value of said data supplied to the encoding station.

The sole FIGURE is an encryption/decryption system in accordance with a preferred embodiment of the present invention.

DETAILED DESCRIPTION OF A PREFERRED EMBODIMENT

In the sole FIGURE, a common signal source 10 including an antenna 12 broadcasting a signal, to be hereinafter described, which is capable of being received both at an encoding station 20 and a decoding station 60 is illustrated. The purpose of common signal source 10 is to provide a transmittable source of varying digital signals. Signal source 10 contains a means 14 for producing digital signals and modulating the same and a transmitter 16 to radiate by antenna 12 the thus modulated radio frequency carrier signal modulated with the digital information. There are a number of sources already available of such transmitted digital signals. Examples are encoded information in the vertical blanking interval on network television channels such as that used for teletext transmission, digital information transmitted by satellite carriers, timing signals such as those transmitted by radio station WWV, LORAN the navigation system used by aircraft and ships at sea or standard radio and television stations where the transmitted signal is digitized. Further a source constructed specifically for the purpose of the encryption and decryption system about to be described could also be utilized.

Encoding station 20 comprises a receiving antenna 22 coupled to the input of a receiver 24 which amplifies the radio frequency signal received from the source 10. The output of receiver 24 is coupled to the input of a serial data stripper 26 which demodulates the signal received at antenna 22 to produce digital data corresponding to that generated in device 14 but delayed in time by the time taken for the RF signal to travel from transmitter 16 to receiver 24. The output of serial data stripper 26 is coupled to an adjustable delay 28, the purpose of which will be described hereinafter. The output of delay 28 is coupled to a serial-to-parallel converter 30 which converts the serial digital data into data words of an appropriate length for the rest of the system. An exemplary length may be 8 bits to 50 bits, although a length of in excess of a hundred bits may be used in some situations.

The output of serial-to-parallel converter 30 is coupled to a synchronizer 34 as illustrated by a single wide line 32 with a direction indicating arrow.

Synchronizer 34 is coupled to one or both of two pseudorandom code generators 38 and 40, respectively, both being illustrated. Code generators 38 and 40, which are of conventional design, may each be of the linear or non-linear type, the latter providing more security. Each generator accepts digital codes supplied by converter 30 and in turn generates a pseudo random code which repeats after so many passes through the generator as determined by the number of stages in the generator. It will be understood that such generators typically comprise a multiple stage shift register with various gates to accept data from certain stages of the shift register and pass into other stages of the shift register. The greater the number of stages, the longer the time before the code will repeat.

Generator 38, if present, is coupled to a transmitter 42 which, preferably, is a spread spectrum transmitter. The amount of frequency spread and rate at which the spread changes is a function of the output signal from generator 38 as is well known to those skilled in the art of spread spectrum frequency generation.

A typical radio frequency output of transmitter 42 is 200 megahertz plus or minus 20 to 30 megahertz with the carrier completely suppressed. The output of transmitter 42 is coupled to a transmitting antenna 44.

Generator 40, if present, is coupled to a data encryptor 46 of conventional design. A data source 50 is also coupled to a second input of data encryptor 46. The data may be generated by a keyboard operated by an individual or data collected by a computer for example.

Generator 40 and/or generator 38 may also be receptive of a "code of the day" which is a secret code known only to personnel at the encoding station and decoding station. The code is typically changed at both stations one or more times a day.

A master clock 52 is coupled to a clock input of each of synchronizer 34, code generators 38 and 40 and data encryptor 46.

Decoding station 60 has components very similar to those in the encoding station 20 and arranged in the same way. Thus antenna 62 correponds to antenna 22. Receiver 64 corresponds to receiver 24. Serial data stripper 66 corresponds to serial data stripper 26. Delay 68 corresponds to delay 28. Serial-to-parallel converter 70 corresponds to serial-to-parallel converter 30. Synchronizer 74 corresponds to synchronizer 34 and pseudorandom code generators 78 and 80 correspond to code generators 38 and 40. Code generator 78, if present, is coupled to a receiver 82 which also receives a radio frequency signal input by a receiving antenna 84 coupled thereto. Receiver 82, which is of conventional design, is designed to despread the spectrum of the signal which it receives at antenna 84 in accordance with the digital signal applied thereto by pseudorandom code generator 78. The output of receiver 82 is coupled to a data decipher circuit 86 which is also of conventional design. Data decipher circuit 86 is also coupled to receive signals from pseudorandom code generator 80. The output of the deciphered data produced by circuit 86 is transmitted to a data utilization device 90. The data supplied to data utilization device 90 is the same as the data input from data source 50. The output of master clock 92 is coupled to the clock inputs of synchronizer 74, code generators 78 and 80 and data decipher circuit 86.

Operation of the encryption/decryption system is as follows. A key to proper operation is the setting of delays 28 and 68. It will be assumed for the sake of the discussion that follows that signal transfer time of data from the output of delay 28 to and through the various components illustrated physically above it is the same as signal transfer time of data from the output of delay 68 to and through the various components illustrated physically above it within decoding station 60.

It will be assumed that the total digital data delay time from antenna 12 to the output of delay 28 is A. It will be further assumed that the total encrypted data delay time from antenna 44 to antenna 84 is B. Finally it will be assumed that the total digital data delay time from antenna 12 to the output of delay 68 is C. Then delays 28 and 68 must be set such that $C=A+B$. In fact typically in a system in which encoding station 20 is fixed relative to signal source 10, delay 28 is not necessary or in other words is of zero length. In this case the output of stripper 26 may be connected to the input of converter 30.

In a system in which encoding station 20 is not fixed in distance from signal source 10 but rather is moving then delay 28 is necessary and must be adjusted in accordance with that movement such that the delay therein relates to the varying distance of encoding station 20 from common signal source 10 and from decoding station 60 such as to maintain the equality $C=A+B$.

Delay 68 is set by knowing the distance from signal source 10 to the encoding and decoding stations 20 and 60 respectively and the distance from encoding station 20 to decoding station 60. As a practical matter it is typically impossible to know the exact distance between the signal source and the two stations. Once delay 68 is set approximately, transmission of test data will soon reveal whether the setting is proper and, if improper, minor adjustments can be made.

Once adjustment of delays 68 and, if appropriate, 28 is effected, operation of the system proceeds as follows. Receivers 24 and 64 are appropriately tuned to receive the signal transmitted from a desired signal source 10 of those previously listed, that is a signal source which includes varying digital information. In serial data stripper 26 the carrier of the signal received at antenna 22 is stripped away leaving only a digital binary signal. The serial digital signal delayed, if appropriate, by delay 28 is converted to a succession of parallel words in serial-to-parallel converter 30. Each parallel word thus created is passed to synchronizer 34, which basically is a gate circuit having as one input the signals representing various bits from serial-to-parallel converter 30 and having, as another input, pulses from clock 52. The clock pulses are divided within synchronizer 34 as appropriate such that digital data appearing at converter 30 is clocked out of synchronizer 34 in accordance with when the generators 38 and 40 coupled to receive data from synchronizer 34 need new digital data. Code generator 40, upon receiving a digital word from synchronizer 34 or more particularly from converter 30, produces a pseudorandom code output which is applied to data encryptor 46. Every time generator 40 receives a new digital word from converter 30, a new pseudorandom code is generated to be applied to data encryptor 46. Additionally pseudorandom code generator 40 may be receptive of a "code of the day" which is used to further randomize the signal produced at the output of generator 40. The "code of the day" is a secret code known to the encryption department and decryption department so that each day or perhaps several times a day the code is changed.

Similarly, with respect to code generator 38, the output of code generator 38, which is a function of the digital signal emanating from the common signal source 10, determines the rate at which the frequency spreading changes in transmitter 42. The radio frequency signal generated in transmitter 42 is modulated in accordance with the encrypted data from encryptor 46 and the resulting encrypted data over an RF frequency spectrum is transmitted by antenna 44 to antenna 84 of decoding station 60. As with code generator 40 a "code of the day" may also be applied to generator 38 to further control the spreading of radio frequency signal from transmitter 42.

Decoding station 60 essentially performs the reverse procedure of that described with regard to encoding station 20. The signal from transmitter 12 arrives at synchronizer 74 in synchronism with when data from source 50 encrypted using a particular signal from signal source 10 arrives at receiver 82. Receiver 82 acts in a manner complementary to transmitter 42 to despread the signal in accordance with signals applied from generator 78 which, in turn depend from a signal supplied by synchronizer 74, such that the radio frequency signal is removed and only the encrypted data arrives at data decipher circuit 86. Deciphering occurs in accordance with an output from generator 80 which is determined by the signal supplied from common signal source 10. If a "code of the day" is used in encoding station 20 then the same code must be used and applied to generators 78 and 80. The output from decipher station 86 is coupled to data utilization device 90.

It was mentioned earlier that after delay 68 and, if utilized, delay 28 are adjusted in accordance with known or assumed distances from signal source 10 to each of the encoding and decoding stations and the distance from the decoding station to the encoding station, a fine adjustment may have to be made. This will become obvious once decrypted signals are received at data utilization device 90. If in fact the signals coming out of data decipher circuit 86 are garbled then it indicates that one or both of delays 68 and 28 are inappropriately set and a minor adjustment can be made until the output at utilization device 90 provides intelligible information. It is well known to provide a test data to allow such adjustment to be made.

It was mentioned earlier that it is not necessary to use the codes supplied from signal source 10 to provide for both data encryption and for frequency spectrum spreading. For example, transmitter 42 could be set to transmit a single carrier or frequency modulated by output from data encryptor 46. In that case receiver 82 would be adapted to demodulate a single carrier frequency received at antenna 84 to provide the data encyrpted signals at the decipher circuit 86.

The system illustrated in the sole FIGURE has an advantage over prior art systems in that if an enemy was simply to record the signal transmitted by antenna 44 that would not be sufficient information to allow deciphering of the signal. Instead in addition one would have to know, if present, the "code of the day" and the particular signal source 10 which is being utilized. Further it would be required of the enemy to know the locations of the encoding and decoding stations relative to that common signal source so that the proper amount of delay could be determined. This system is thus much more secure than a system which relies simply on a "code of the day" which in fact can be usually ascertained by a spy and is an advance over so called time of day systems in which a time of day determined by a wrist watch is simply fed into generators 38 and 40 in encoding station 20 and generators 78 and 80 and in decoding station 60.

What is claimed is:

1. An encryption/decryption system for receiving and utilizing code modifying signals from an independent signal source station wherein said signal source station is the sole source of code modifying signals for encryption and decryption and which comprises means for transmitting a carrier modulated in accordance with digital code modifying signals which vary with time, said system further comprising, in combination:
    an encoding station; and
    a decoding station;
said encoding station for transmitting, in encrypted form an encoded data signal comprising in combination:
    means for receiving said modulated carrier from said independent signal source station and for demodulating the carrier to produce a time varying digital code modifying signal;
    means, responsive to said code modifying signal for encrypting a predetermined data signal in accordance with the value of said digital code modifying signal for forming the encoded data signal; and
    means for transmitting the encoded data signal over a radio frequency; and
said decoding station for decrypting the encoded data signal received from the encoding station comprising in combination:
    means for receiving the said modulated carrier from said independent signal source station and for demodulating the carrier to thus produce the same code modifying digital signal received at the encoding station;
    means for delaying said code modifying digital signal in accordance with the distance to said decoding station from said signal source station and the distance between said encoding station and said decoding station; and
    means for receiving the encoded data signal from said encoding station and means responsive to the delayed code modifying digital signal from said signal source station for decrypting the encoded data signal to produce a signal having the value of said predetermined data signal encoded at and transmitted from the encoding station.

2. The combination as set forth in claim 1, wherein said one of means for encrypting comprises a pseudorandom code generator responsive to the value of said digital signal for producing a pseudorandom code, the pseudorandom code for encrypting the predetermined data signal.

3. The combination as set forth in claim 2, further including a source of random code and wherein said pseudorandom code generator is responsive to said random code for producing the pseudorandom code as a function of the value of said digital signal and of said random code.

4. The combination as set forth in claim 1, wherein said means for transmitting includes means for supplying the encrypted signal over a radio frequency spectrum spread in accordance with the value of said digital signal.

5. The combination as set forth in claim 4, wherein said means for transmitting further comprises a pseudorandom code generator responsive to the value of said digital signal for producing a pseudorandom code and a radio frequency transmitter responsive to the pseudorandom code for producing a radio frequency signal spread over a frequency range as a function of the value of said pseudorandom code.

6. The combination as set forth in claim 5, wherein said pseudorandom code generator is further responsive to a random code for producing a pseudorandom code which is both a function of the value of said digital signal and of said random code.

7. The combination as set forth in claim 2, further including storage means coupled to said pseudorandom code generator for storing a predetermined number of bits of the digital signal and for supplying to said pseudorandom code generator previously stored bits representative of the digital signal at a rate corresponding to the rate at which said pseudorandom code generator operates.

8. The combination as set forth in claim 5, further including storage means coupled to said pseudorandom code generator for storing a predetermined number of bits of the digital signal and for supplying to said pseudorandom code generator previously stored bits representative of the digital signal at a rate corresponding to the rate at which said pseudorandom code generator operates.

9. The combination as set forth in claim 5, wherein said means receptive of the encoded data signal from said encoding station comprises a pseudorandom code generator responsive to the value of said digital signal for producing a pseudorandom code in accordance with the value of said digital signal and further comprises means for despreading the received signal in accordance with said psuedorandom code.

10. The combination as set forth in claim 2, wherein said means receptive of the encoded data signal from said encoding station comprises a pseudorandom code generator responsive to the value of said digital signal for producing a pseudorandom code in accordance with the value of said digital signal and further comprises means responsive to the pseudorandom code for decrypting said encoded data signal for generating a signal representative of the value of said predetermined data signal.

11. The combination as set forth in claim 1, wherein the means for delaying the digital signal includes means for delaying the digital signal such that the time for a predetermined digital signal value to reach said encoding station when added to the time to transmit a predetermined bit of data from said encoding station to said decoding station is equal to the time for the predetermined digital signal value to reach said encoding station when added to the time to transmit a predetermined bit of data from said encoding station to said decoding station is equal to the time for the predetermined digital signal value to reach said decoding station and pass through said delay located therein.

12. The system as in claim 1, wherein the encoding station further includes means for delaying the digital signal in accordance with the distance between the encoding station and the signal source.

13. The system as in claim 1, wherein the encoding station further includes means for spreading the spectrum of the encoded data signal in accordance with the value of the digital signal and further wherein the decoding station further includes means for despreading the spread spectrum of the encoded data signal in accordance with the value of the digital signal.

14. A method for encrypting and decrypting data at geographically separated encoding and decoding stations, comprising:

the step of transmitting a carrier modulated with a time varying predetermined code from a geographicaly separate common transmitting station;

encoding predetermined data at an encoding station with the predetermined code received from said common station for forming encoded data, including the step of extracting the code modifying from the carrier received from said common station wherein the encoded predetermined data at the encoding station is determined solely in response to a code modifying signal received at the encoding station from said common station;

transmitting the encoded data to a receiving station; and decoding the encoded data at the receiving station utilizing the predetermined code for recovering the predetermined data, including the step of extracting the code modifying signal from the signal received from said common station to produce the predetermined data is recovered at the receiving station solely in response to the code modifying signal received from the common station.

15. The method as in claim 14, wherein the step of decoding further includes delaying the step of decoding until the encoded data is decoded at the same relative time with respect to the signal from the common station that the predetermined data was encoded.

16. The method as in claim 14, wherein the step of encoding further includes predeterminedly spreading the spectrum of the encoded data and wherein the step of decoding further includes predeterminedly despreading the spectrum of the encoded data.

17. The method as in claim 14, wherein the step of encoding further includes delaying the step of encoding for compensating for relative motion among the encoding station, the decoding station and the common station.

* * * * *